US012492537B2

(12) United States Patent
Möller et al.

(10) Patent No.: US 12,492,537 B2
(45) Date of Patent: Dec. 9, 2025

(54) SANITARY FITTING COMPRISING A PLUG UNIT

(71) Applicant: GROHEDAL Sanitärsysteme GmbH, Porta Westfalica (DE)

(72) Inventors: Jörg Möller, Porta Westfalica (DE); Christian Koch, Porta Westfalica (DE); Sebastian Willeitner, Munich (DE)

(73) Assignee: GROHEDAL SANITARSYSTEME GMBH, Porta Westfalica (DE)

( * ) Notice: Subject to any disclaimer, the term of this patent is extended or adjusted under 35 U.S.C. 154(b) by 1064 days.

(21) Appl. No.: 17/599,319

(22) PCT Filed: Mar. 5, 2020

(86) PCT No.: PCT/EP2020/055880
§ 371 (c)(1),
(2) Date: Sep. 28, 2021

(87) PCT Pub. No.: WO2020/200633
PCT Pub. Date: Oct. 8, 2020

(65) Prior Publication Data

US 2022/0186478 A1 Jun. 16, 2022

(30) Foreign Application Priority Data

Mar. 29, 2019 (DE) ........................ 102019002259.9

(51) Int. Cl.
*E03C 1/05* (2006.01)
*H01R 13/73* (2006.01)

(52) U.S. Cl.
CPC ............ *E03C 1/057* (2013.01); *H01R 13/73* (2013.01)

(58) Field of Classification Search
CPC ........ E03C 1/057; E03C 1/0404; H01R 13/73
(Continued)

(56) References Cited

U.S. PATENT DOCUMENTS 4,886,207 A * 12/1989 Lee ........................ E03C 1/057 251/30.01
5,586,746 A * 12/1996 Humpert ................ E03C 1/057 251/129.04
(Continued)

FOREIGN PATENT DOCUMENTS

DE 44 20 331 12/1995
DE 20 2007 004 832 8/2008
(Continued)

OTHER PUBLICATIONS

International Search Report issued Jun. 2, 2020, in International (PCT) Application No. PCT/EP2020/055880, with English translation.

*Primary Examiner* — David P Angwin
*Assistant Examiner* — William R Klotz
(74) *Attorney, Agent, or Firm* — Wenderoth, Lind & Ponack, L.L.P.

(57) ABSTRACT

A sanitary fitting (1) containing an outer housing (2) having a sensor (3), wherein the sensor (3) contains at least a first electrical connector (4), and an inner housing (5) to which a connector assembly (11) having at least one second electrical connector (6) is attached in a detachable manner, wherein the inner housing (5) can be disposed in the outer housing (2) in such a way that the at least one first electrical connector (4) and the at least one second electrical connector (6) form a first electrical plug connection (7).

9 Claims, 2 Drawing Sheets

(58) Field of Classification Search
USPC ........................................................ 4/668, 623
See application file for complete search history.

(56) References Cited

U.S. PATENT DOCUMENTS

| | | | | |
|---|---|---|---|---|
| 6,006,784 | A | 12/1999 | Tsutsui et al. | |
| 7,627,909 | B2 * | 12/2009 | Esche ..................... | E03C 1/057 251/263 |
| 7,650,653 | B2 * | 1/2010 | Johnson ................ | E03C 1/0401 251/367 |
| 8,162,236 | B2 * | 4/2012 | Rodenbeck ........ | G05D 23/1353 239/447 |
| 8,448,271 | B2 * | 5/2013 | Rudisser ................. | E03C 1/057 4/623 |
| 2007/0246550 | A1 | 10/2007 | Rodenbeck et al. | |
| 2009/0311914 | A1 * | 12/2009 | Weigen ................... | E03C 1/057 439/660 |
| 2009/0313914 | A1 | 12/2009 | Kovatch et al. | |
| 2010/0071126 | A1 | 3/2010 | Rüdisser | |
| 2014/0116553 | A1 * | 5/2014 | Schoolcraft ............. | E03C 1/057 137/801 |
| 2023/0106648 | A1 * | 4/2023 | Philipps ................ | E03C 1/0403 4/677 |
| 2023/0193602 | A1 * | 6/2023 | Schulte ................. | E03C 1/0403 137/315.12 |

FOREIGN PATENT DOCUMENTS

| | | |
|---|---|---|
| EP | 1 785 531 | 5/2007 |
| EP | 2 169 123 | 3/2010 |

* cited by examiner

SANITARY FITTING COMPRISING A PLUG UNIT

This invention relates to a sanitary fitting which is used, in particular, to provide water on demand at a washbasin, sink, shower and/or bathtub.

Sanitary fittings can, for instance, be designed in the manner of faucets or shower heads, which can be disposed in the area of washbasins, sinks, showers and/or bathtubs for the purpose of personal hygiene or for cleaning objects. Such sanitary fittings regularly have functional units, such as mixing valves, mixing cartridges, and/or valves for adjusting a temperature of the dispensed water and/or for volume regulation of a water flow. Sensors of the sanitary fitting can control the functional units, which sensors, for instance, detect the presence of a user or gestures of a user and which sensors are connected to the functional units via cable connections. Furthermore, the functional units may be disposed in an inner housing of the sanitary fitting. When installing the sanitary fitting, the inner housing including the functional units is first attached to a support, for instance a countertop or sink. Then an outer housing of the sanitary fitting with the sensors is fitted to the inner housing and attached to the inner housing. If the functional units have to be serviced or replaced in the event of a defect, the outer housing is again removed from the inner housing. In this instance it is possible that the cable connection between the sensors and the functional units jam or tear off. This results in high repair costs. Sanitary fittings are therefore already known in which the sensors are connected to the functional units via electrical contacts on the inner housing. However, they have the disadvantage that the electrical contacts at the inner housing cannot be adapted to different sensors.

It is therefore the object of the invention to at least partially solve the issues described with reference to the prior art and, in particular, to specify a sanitary fitting in which functional units can be serviced without risk of damage to electrical connections between sensors and the functional units and in which the electrical connections can be adapted to the needs of different sensors.

These objects are met by a sanitary fitting according to the features of the independent claim. Further advantageous embodiments of the sanitary fitting are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A sanitary fitting having at least the components listed below contributes to meeting the objective:

an outer housing having a sensor, wherein the sensor comprises at least a first electrical connector, and an inner housing to which a connector assembly, having at least one second electrical connector, is attached in a detachable manner, wherein the inner housing can be disposed in the outer housing in such a way that the at least one first electrical connector and the at least one second electrical connector form a first electrical plug connection.

The sanitary fitting is used in particular to provide water on demand at a sink, washbasin, shower and/or bathtub. For this purpose, the sanitary fitting comprises an outer housing, which may, for instance, be at least partially made of plastic and/or metal, such as brass. In particular, the outer housing is at least partially tubular and/or can have an installation space for an inner housing in its interior. Furthermore, the outer housing comprises at least one sensor, which may be an infrared sensor, for instance. The outer housing may comprise an opening for the at least one sensor. Further, the at least one sensor may be at least partially disposed in the opening and/or on an inner circumferential surface or at least partially disposed in the inner installation space of the outer housing. In particular, the at least one sensor may be attached to the inner circumferential surface of the outer housing. An adhesive connection, for instance based on double-sided adhesive tape, can be formed to attach the at least one sensor to the outer housing. The at least one sensor can be used to detect the presence of a user, for instance. In particular, the at least one sensor can be used to detect whether the user is holding at least one hand under an outlet opening of the sanitary fitting and/or is performing gestures to control the sanitary fitting. The at least one sensor may comprise or be connected to a controller, which can be used to control the at least one functional unit of the sanitary fitting. To this end, the controller may comprise at least one microprocessor. The functional unit may, for instance, be a valve, in particular of the solenoid valve type, which can be used to control a dispensing of water. In particular, the valve is disposed in a fluid duct of the sanitary fitting. In particular, the control opens the valve when the at least one sensor has detected the presence of the user or at least one hand of the user under the outlet opening of the sanitary fitting. Accordingly, the control system closes the valve in particular if the at least one sensor does not detect any presence of the user or any hand of the user under the outlet opening of the sanitary fitting. Furthermore, the functional unit can also be a mixing valve, for instance a kind of mixing shaft, or a mixing cartridge. For instance, cold water at a cold-water temperature and hot water at a hot-water temperature may be supplied to the mixing valve or mixing cartridge, wherein the cold water and hot water can be mixed by the mixing valve or mixing cartridge to form mixed water at a desired mixed water temperature. The cold-water temperature is in particular at most 25° C. (Celsius), preferably 1° C. to 25° C., particularly preferably 5° C. to 20° C. and/or the hot-water temperature is in particular at most 90° C., preferably 25° C. to 90° C., particularly preferably 55° C. to 65° C. To set the desired mixed water temperature, the mixing valve or the mixing cartridge can be actuated, for instance, via an actuating element of the sanitary fitting that can be operated by the user, for instance in the manner of a lever. Furthermore, it can also be provided that the mixing valve or the mixing cartridge can be actuated by the control system as a function of gestures of the user detected by the sensor. The sensor comprises at least a first electrical connector. The at least one first electrical connector may be, for instance, a plug or a socket. The plug may have at least one contact pin and/or the socket may have at least one contact opening. For instance, 2 to 10 contact pins and/or 2 to 10 contact openings can be provided depending on the sensor and/or depending on the functional unit to be controlled.

The inner housing can also be made in particular at least partially of plastic and/or metal, such as brass. Preferably, the inner housing may be manufactured by way of plastic injection molding. The inner housing is in particular (mainly) cylindrical in shape. Further, the inner housing may have an outer circumferential surface having a diameter substantially equal to an inner diameter of the outer housing. Furthermore, the inner housing is used in particular to at least partially accommodate the at least one functional unit. In particular, the valve, the mixing valve, and/or the mixing cartridge may be at least partially disposed within the inner housing. The individual functional units may be interconnected by at least one fluid duct formed in the inner housing.

A connector assembly having at least a second electrical connector is detachably attached to the inner housing. In particular, the connector can be at least partially made of plastic. The at least one second electrical connector may also, for instance, be a plug or a socket. The plug may have at least one contact pin and/or the socket may have at least one contact opening. For instance, 2 to 10 contact pins and/or 2 to 10 contact openings may be provided depending on the sensor and/or depending on the functional unit to be controlled. If the at least one first electrical connector is designed as a socket, then the at least one second connector is preferably designed as a plug. If the at least one first electrical connector is designed as a plug, then the at least one second connector is preferably designed as a corresponding socket. The at least one second electrical connector of the connector assembly is in particular (electrically) connected to the functional unit to be controlled and/or to an energy source for the at least one sensor, for instance a battery or a power supply unit.

When installing the sanitary fitting, the inner housing can first be attached in particular to a support, for instance a worktop or sink. Subsequently, the outer housing can be pushed onto the inner housing in particular, such that the inner housing extends at least partially through a mounting opening of the outer housing into the installation space of the outer housing. In this case, the inner housing may be disposed in the outer housing in such a way that the at least one first electrical connector of the at least one sensor and the at least one second electrical connector of the connector assembly form a first electrical plug connection. This means in particular that when the outer housing is fitted onto the inner housing, the at least one first electrical connector and the at least one second electrical connector are (detachably) plugged into each other or (detachably) electrically connected to each other. The at least one sensor or the controller is electrically connected to the functional unit to be controlled and/or to the energy source through the first electrical plug connection. For the connection of the at least one sensor and the functional unit to be controlled or the energy source, therefore no cable connections have to be made between the outer housing and the inner housing, which cable connections could be pinched and damaged when the outer housing is dismantled from the inner housing. Furthermore, the connector assembly can be easily exchanged for a connector assembly whose at least one second electrical connector matches the at least one first electrical connector of the sensor used, i.e. in particular has a congruent shape and/or a matching number of contacts.

The inner housing can have a seat, into which the connector assembly can be inserted. The seat is in particular a recess in the inner housing, into which the connector assembly can be at least partially inserted. For this purpose, a shape of the seat is adapted in particular to an outer contour of the connector assembly.

The seat may be disposed on a circumferential surface of the inner housing. Furthermore, the seat may be disposed in particular in the area of a longitudinal end of the inner housing on the circumferential surface. The longitudinal end of the inner housing is, in particular, the longitudinal end of the inner housing which can be used to attach the inner housing to the support. After the connector has been inserted into the seat, the connector may at least partially form the outer circumferential surface of the inner housing.

The connector assembly may be insertable into the seat in a longitudinal direction of the inner housing.

The seat may have an opening for a cable of the connector assembly. The cable can be used to connect the connector assembly to the power source in particular. In particular, the opening extends through the inner housing in such a manner that the cable can be fed to the connector assembly from that longitudinal end of the inner housing, which can be used to attach the inner housing to the support.

A fastening element of the sanitary fitting may be used to attach the connector assembly to the inner housing. The fastening element attaches the connector assembly in particular in the seat of the inner housing. Thus, the fastening element attaches not only the sanitary fitting to the support, but additionally fastens the connector assembly in the seat. This means that no additional components are required to attach the connector assembly to the inner housing.

The fastening element may be a nut into which a threaded bolt can be screwed for attaching the sanitary fitting. In particular, the threaded bolt extends from the nut to an end of the support opposite to the sanitary fitting, on which the threaded bolt can be attached to the support using adequate fastening elements.

The fastening element can be insertable into the inner housing. The fastening element can be inserted into the inner housing in particular in such a way that it is secured against rotation relative to the inner housing, in particular when the threaded rod is screwed in.

The fastening element may have a retaining lug that attaches the connector assembly in the seat. The retaining lug preferably extends in a radial direction of the fastening element. Furthermore, the retaining lug can contact the connector assembly at a blocking surface such that the connector assembly is positively secured in the seat.

The connector assembly can have a third electrical connector, which can be used to electrically connect the connector assembly to at least one functional unit of the sanitary fitting. The third electrical connector can also be a plug or a socket. The third electrical connector can, in particular, establish a second electrical plug connection, which can be used to electrically connect the functional unit to be controlled to the at least one second electrical connector of the connector assembly.

The invention and the technical environment are explained in more detail below with reference to the Figures. It should be noted that the Figures show a particularly preferred embodiment variant of the invention, but the invention is not limited thereto. The same reference signs are used for the same components in the Figures. In an exemplary and schematic manner FIG. 1 shows a perspective view of a sanitary fitting;

Figure 1:
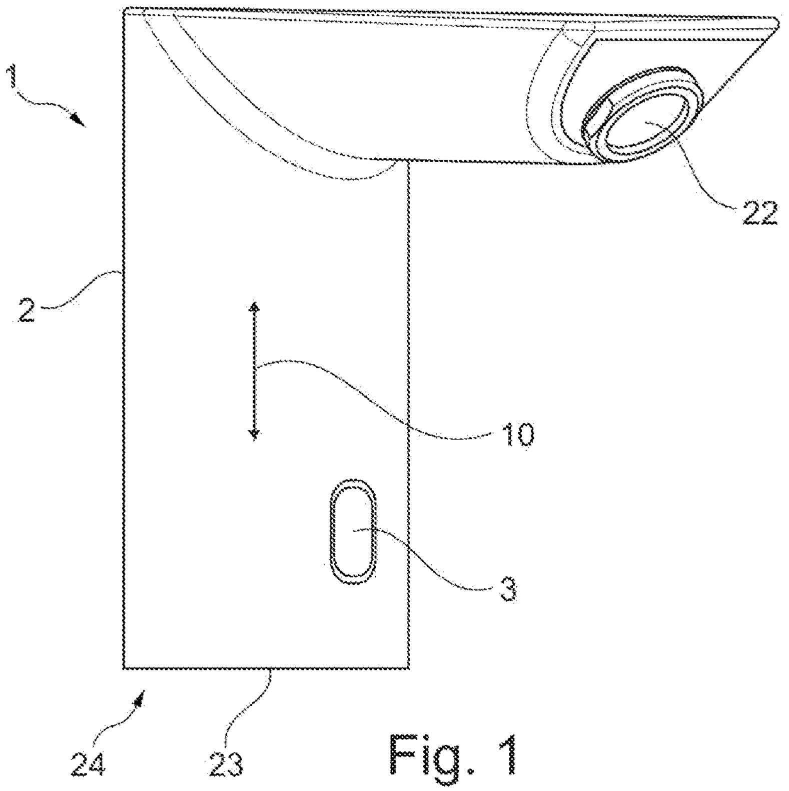

FIG. 1 shows a perspective view of the sanitary fitting 1. The sanitary fitting comprises an outer housing 2, on which a sensor 3 is disposed. In the embodiment variant shown here, the sensor 3 is an infrared sensor, which is used to control the dispensing of a liquid through an outlet opening 22 of the outer housing 2. The outer housing 2 has an installation opening 23 at a longitudinal end 24, from which the outer housing 2 extends tubular in a longitudinal direction 10.

Figure 2:
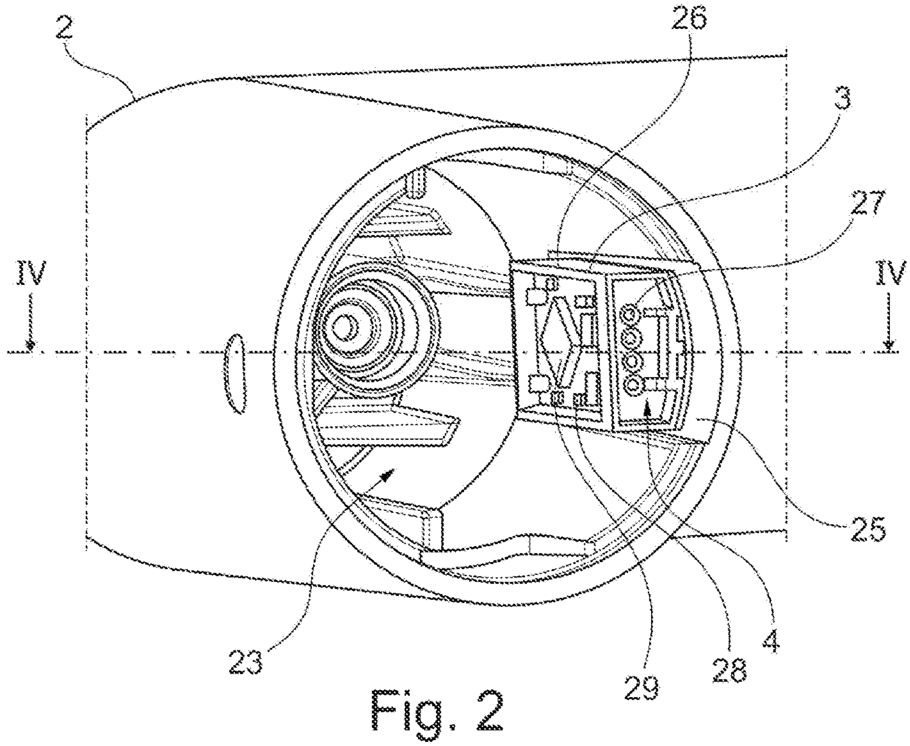
FIG. 2 shows a view of an outer housing of the sanitary fitting.

FIG. 2 shows a view into the outer housing 2 through the installation opening 23. In particular, the sensor 3, which is attached to an inner circumferential surface 25 of the outer housing 2, can be seen here. The sensor 3 comprises a first electrical connector 4 at a sensor housing 26. In this case, the first electrical connector 4 is designed in the manner of a socket having 4 contact openings 27. The contact openings 27 are electrically connected to a printed circuit board 28 of the sensor 3, which comprises a microprocessor 29.

Figure 3:
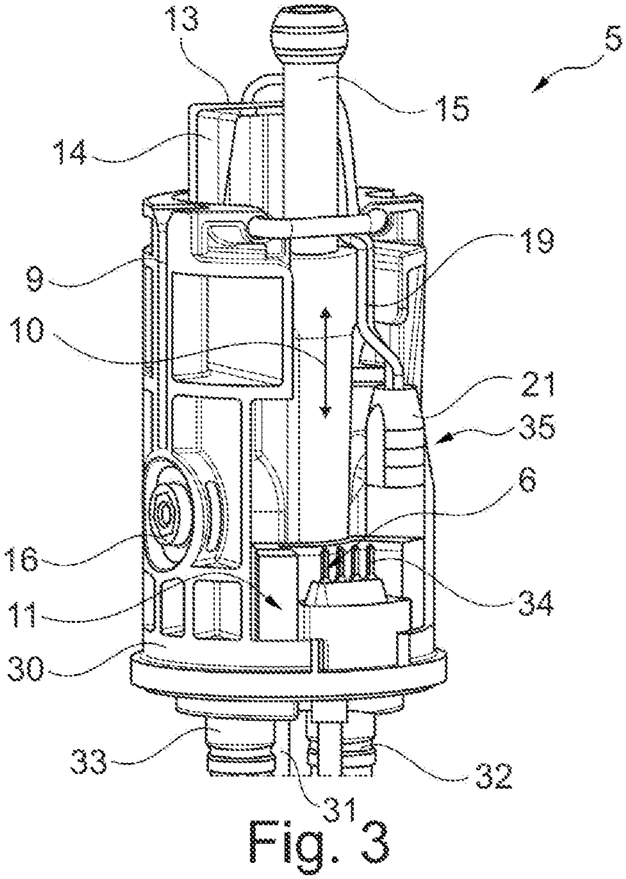
FIG. 3 shows a perspective view of an inner housing of the sanitary fitting.

FIG. 3 shows a perspective view of an inner housing 5 of the sanitary fitting 1 of FIG. 1. A threaded bolt 31 can be used to attach the inner housing 5 to a support not shown here, for instance to a worktop or a sink. Subsequently, the installation opening 23 of the outer housing 2 of the sanitary fitting 1 shown in FIGS. 1 and 2 can be pushed onto the inner housing 5 and attached to the inner housing 5. For this purpose, the inner housing 5 is mainly cylindrical in shape and has a circumferential surface 30, the outer diameter of which largely matches an inner diameter of the outer housing 2. The circumferential surface 30 comprises a guide 9, which is formed in the manner of a groove extending in the longitudinal direction 10 of the inner housing 5 in this instance. The guide 9 can be used to plug the outer housing 2 onto the inner housing 5 in a predetermined orientation. Cold water can be supplied to the inner housing 5 via a cold-water line 32 and hot water via a hot-water line 33. The cold water and hot water are supplied to a mixing valve 16 inside the inner housing 2 via fluid ducts not shown here, which mixing valve is designed in the manner of a mixing shaft having an outer mixing contour in this case. The mixing valve 16 can be used to mix the cold water and the hot water to form a mixed water having a desired mixed water temperature. The mixing shaft can be rotated around an axis of rotation to set the mixed water temperature. For this purpose, the sanitary fitting 1 shown in FIG. 1 may have a lever by means of which the mixing valve 16 can be operated by a user of the sanitary fitting 1. The mixed water can then be fed to the outlet opening 22 of the outer housing 2 shown in FIG. 1 via a liquid channel 15. A functional unit 13 in the form of a valve 14, which in this case is a solenoid valve, is disposed in the fluid duct 15. The valve 14 can be used to control the dispensing of the liquid through the sanitary fitting 1.

A connector assembly 11 having a second electrical connector 6 is detachably attached to the inner housing 5. The second electrical connector 6 is a plug having 4 contact pins 34 in this case. When the outer housing 2, shown in FIGS. 1 and 2, is fitted onto the inner housing 5, the first electrical connector 4 of the sensor 3 shown in FIG. 2 and the second electrical connector 6 of the connector assembly 11 form a first electrical plug-connection 7 shown in FIG. 4. Furthermore, the connector 11 is connected to the valve 14 via a cable 19. For this purpose, the cable 19 has a third electrical connector 21 for forming a second electrical plug-connection 35 with the connector element 11, such that the cable 19 is detachably connected to the connector 11. The connector 11 is inserted into a seat 17 of the inner housing 5 such that the connector 11 is flush with the circumferential surface 30 of the housing 5.

Figure 4:
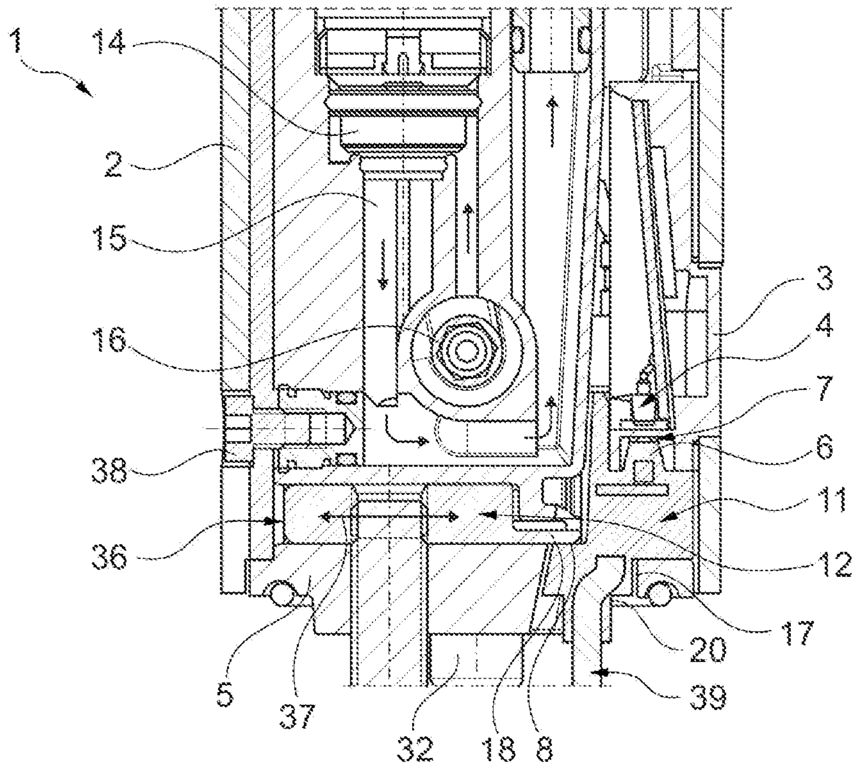
FIG. 4 shows a sectional view of a part of the sanitary fitting.

FIG. 4 shows an area of the sanitary fitting 1 after the outer housing 2 has been pushed onto the inner housing 5 in a sectional view along the sectional line IV-IV shown in FIG. 2. The outer housing 2 is attached to the inner housing 5 by means of a screw 38. The first electrical connector 4 of the sensor 3 and the second electrical connector 6 of the connector assembly 11 form a first electrical plug-connection 7 in this case. It electrically connects the sensor 3 to the valve 14 such that the microprocessor 29 of the sensor 3 shown in FIG. 2 can control the valve 14. The valve 14 is located in a fluid duct 15 that leads from the mixing valve 16 to the discharge opening 22 shown in FIG. 1. The connector assembly 11 is fitted into the seat 17 of the inner housing 5 and a fastening element 12 is used to attach it in the seat 17. The seat 17 has an opening 20 through which a power supply line 39 can be fed to the connector assembly 11. Electrical energy can be supplied to the sensor 3 and/or the valve 4 from an energy source, for instance a battery or a power supply unit, through the energy supply line 39. The fastening element 12 is inserted into the inner housing 5 through a side opening 36 of the inner housing 5, such that a retaining lug 18 holds the connector assembly 11 in the seat 17 in a form-fitting manner. The retaining lug 18 extends in a circumferential direction 37 of the fastening element 12 and contacts the connector assembly 11 at a blocking surface 8. In addition to the connector assembly 11, the fastening element 12 also attaches the cold-water line 32 and the hot-water line 33 shown in FIG. 3 to the inner housing 5. Furthermore, the threaded bolt 31 is screwed into the fastening element 12, which can be used to attach the sanitary fitting 1 to a support not shown here.

The present invention permits functional units of a sanitary fitting to be maintained without risk of damage to electrical connections between sensors and the functional units, and permits the electrical connections to be adapted to the needs of different sensors.

LIST OF REFERENCE NUMERALS

1 sanitary fitting
2 outer housing
3 sensor
4 first electrical connector
5 inner housing
6 second electrical connector
7 first electrical plug connection
8 blocking surface
9 guide
10 longitudinal direction
11 connector assembly
12 fastening element
13 functional unit
14 valve
15 fluid duct
16 mixing valve
17 seat
18 retaining lug
19 cable
20 opening
21 third electrical connector
22 outlet opening
23 installation opening
24 longitudinal end
25 inner circumferential surface
26 sensor housing
27 contact openings
28 printed circuit board
29 microprocessor
30 circumferential surface
31 threaded bolt
32 cold-water line
33 hot-water line
34 contact pin
35 second electrical plug connection
36 lateral opening
37 circumferential direction
38 screw
39 energy supply line

The invention claimed is:

1. A sanitary fitting (1) comprising:

an outer housing (2) comprising a sensor (3), wherein the sensor (3) comprises at least a first electrical connector (4), and wherein the sensor (3) is attached to an inner circumferential surface of the outer housing (2), and an inner housing (5) to which a connector assembly (11) is attached in a detachable manner, wherein the connector assembly (11) comprises at least one second electrical connector (6), wherein the inner housing (5) is configured to be disposed in the outer housing (2) such that the at least one first electrical connector (4) and the at least one second electrical connector (6) form a first electrical plug connection (7), wherein the inner housing (5) comprises a seat (17) configured to allow the insertion of the connector assembly (11), and wherein the seat (17) is disposed on a circumferential surface (30) of the inner housing such that the connector assembly (11) is flush with the circumferential surface (30) of the (5) inner housing (5).

2. The sanitary fitting (1) according to claim 1, wherein the connector assembly (11) is configured to be inserted into the seat (17) in a longitudinal direction (10) of the inner housing (5).

3. The sanitary fitting (1) according to claim 1, wherein the seat (17) has an opening (20) for a cable (19) of the connector assembly (11).

4. The sanitary fitting (1) according to claim 1, wherein a fastening element (12) of the sanitary fitting (1) is used to attach the connector assembly (11) to the inner housing (5).

5. The sanitary fitting (1) according to claim 4, wherein the fastening element (12) is a nut into which a threaded bolt (31) is configured to be screwed for attaching the sanitary fitting (1).

6. The sanitary fitting (1) according to claim 4, wherein the fastening element (12) is configured to be inserted into the inner housing (5).

7. The sanitary fitting (1) according to claim 4, wherein the fastening element (12) has a retaining lug (18) that attaches the connector assembly (11) in the seat (17).

8. The sanitary fitting (1) according to claim 1, wherein the connector assembly (11) has a third electrical connector (21), which is configured to be used to electrically connect the connector assembly (11) to at least one functional unit (13) of the sanitary fitting (1).

9. The sanitary fitting (1) according to claim 1, wherein the seat (17) is a recess in the inner housing (5) into which the connector assembly (11) is configured to be at least partially inserted.

* * * * *